United States Patent [19]

Schroter

[11] 4,065,119

[45] Dec. 27, 1977

[54] PROCESS AND APPARATUS FOR TRANSPORT OF ORIGINALS IN A REPRODUCTION APPARATUS

[75] Inventor: Herbert Schröter, Taunusstein, Germany

[73] Assignee: Hoechst Aktiengesellschaft, Germany

[21] Appl. No.: 732,980

[22] Filed: Oct. 18, 1976

[30] Foreign Application Priority Data

Oct. 16, 1975 Germany .............................. 2546438

[51] Int. Cl.² .......................................... B65H 29/64
[52] U.S. Cl. .................................. 271/172; 271/259; 271/265; 271/270
[58] Field of Search .................. 271/64, 172, 256, 258, 271/259, 265, 270, 199, 202, 80, 9

[56] References Cited

U.S. PATENT DOCUMENTS

| | | | |
|---|---|---|---|
| 3,632,105 | 1/1972 | Verhoeven | 271/265 X |
| 3,770,348 | 11/1973 | Martin | 271/64 X |
| 3,863,913 | 2/1975 | Hirafuji | 271/80 X |
| 3,966,198 | 6/1976 | Komada | 271/265 |

Primary Examiner—Richard A. Schacher
Attorney, Agent, or Firm—James E. Bryan

[57] ABSTRACT

This invention relates to a process for the transport through a copier of an original having a leading and a trailing edge, which comprises transporting the original at least once along a path wherein it passes in the stated order a third point, an illumination zone, a fourth point, a first point, a second point and, if transported more than once, the first point again wherein if the trailing edge has not passed the third point when the leading edge passes the second point the path length between the first and second points is extended and wherein if the trailing edge has not passed the second point when the leading edge passes the first point the path length between the illumination zone and the first point is extended and wherein the speed of the original past the first point may be increased relative to its speed in the illumination zone at least while an extended path is followed between the zone and the first point and after the trailing edge has passed the second point. The invention also relates to an apparatus for performing the process.

19 Claims, 11 Drawing Figures

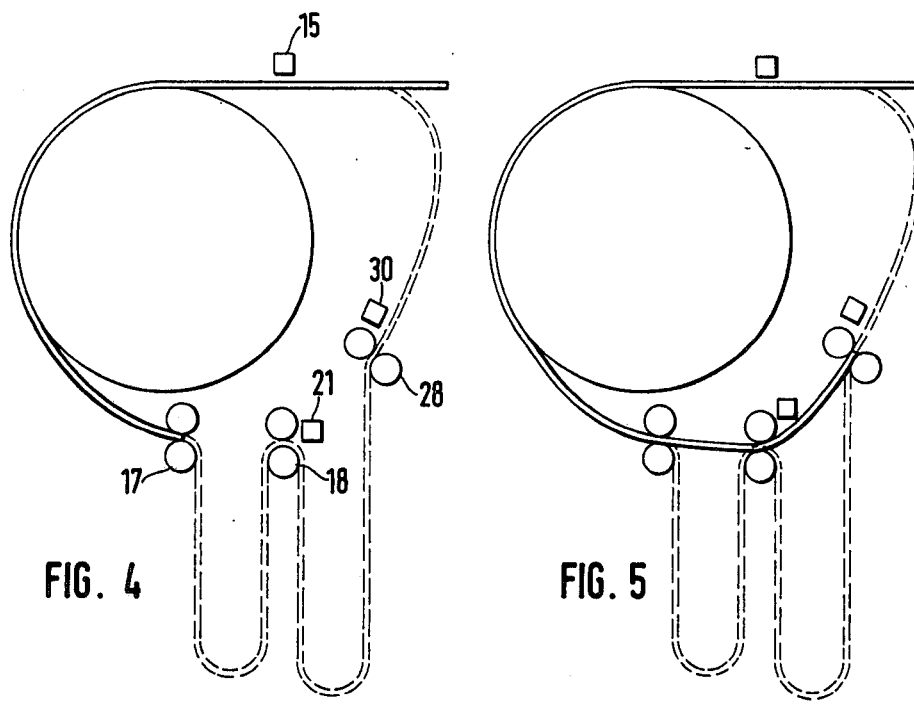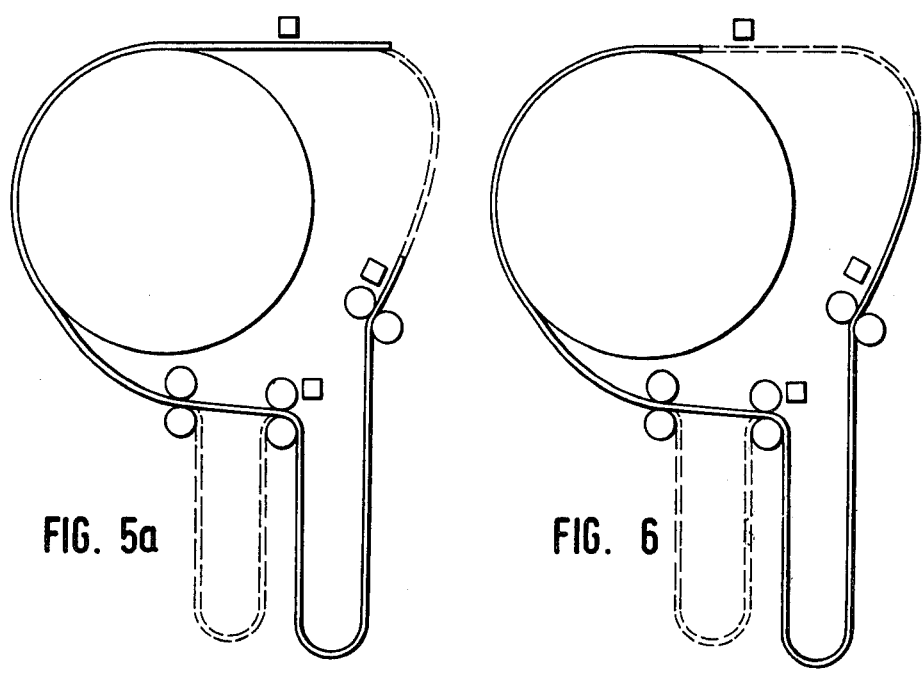

PROCESS AND APPARATUS FOR TRANSPORT OF ORIGINALS IN A REPRODUCTION APPARATUS

The invention relates to a process and apparatus for the repeated transport of an original to be copied along a closed path.

There previously has been proposed in DT-OS 2,026,063 (U.S. Pat. No. 3,614,090) a transport device for the repeated transport of an original to be copied along a closed path, provided with a take-up device for the original the first time it is to be copied, the transport device having a rotatable cylinder which has an illumination zone and is a component of a first transport unit, and a second transport unit and also a holding space in the path, for taking up an intermediate section of the original to be copied. In this proposal, the cylinder described is fitted with a holding device in the form of gripper elements which hold the leading edge of the original. The gripper elements are connected to a releasing device which releases the gripper elements after a predetermined number of movements of the leading edge of the copying material past the illumination point. The cylinder is coupled to a drive mechanism. It is turned so that the leading edge of the original is moved past the illumination device and then stopped at a predetermined point.

In addition, a second transport unit is provided which moves the trailing edge of the original, which has been conveyed so far, past the illumination point, after its leading edge has been stoped. The second transport unit comprises a continuous conveyor. The continuous conveyor rests against the original to be copied and presses the latter against the cylinder in such a way that it can shift the original to be copied relative to the cylinder, after the latter has been stopped. In order to prevent, as far as possible, a change of the transport speed of the original to be copied in the illumination zone, when the cylinder is stopped and the transport belts of the continuous conveyor take over the drive, the transport belts are always driven at a speed which is somewhat higher than the circumferential speed of the cylinder, and an overrunning clutch is provided on the cylinder. The cylinder starts readily by means of its own drive, but in the course of its further movement it is rotated by the transport belts. For control purposes, a logic and storage circuit is provided, in which one key is provided for each of the different sizes of copying material and the corresponding sizes of original.

The transport process is started by the cylinder gripping by means of the holding device an original in the 340° placing position and stopping it in the 200° conveyor position for the subsequent copying. Depending on which key of the logic circuit is actuated, for each size of copy a periodically closed cyclic switch which determines the time at which the leading edge of the original to be copied starts to move from the conveyor position, becomes effective. The leading edge is moved past the illumination zone into the conveyor position and is stopped there, and the transport belts then move the remaining original further on without interruption. From the moment of stopping, a loop then forms between the holding device of the cylinder and the transport belts. When the trailing edge has been transported through the illumination zone, a new transport procedure is initiated, under the control of the continuously driven cyclic switch, by restarting the cylinder with the holding device. In the case of larger originals to be copied, the impulse switch is closed only for every second impulse given by an arrangement of main cams, so that a cycle is started correspondingly later. In this way, larger documents can leave the conveyor position only at every second closing of the switch. Movement of the leading edge of the original to be copied under its trailing edge is avoided.

The disadvantage of this procedure is that the cycle times for certain sizes of original to be copied are rigidly predetermined by the switch position and that the cylinder is stopped in the conveyor position before each renewed coping procedure. The provision of transfer of the material from the first transport unit the second transport unit results in a relatively complicated construction, in order to achieve a uniform advance through the illumination zone. Above all, however, it is necessary that the leading edge of the original be fixed to the cylinder, for the purpose of transportation, in a releasable manner. Apart from the fact that the holding device, required for this, together with its actuating device is relatively expensive, this means that there is no freedom in the design of the cylinder. As a result, the field of application of the process for the repeatable transport of originals is considerably restricted. In particular, the proposal is not suitable for use with a cylinder in which, as in certain types of blueprint machines, the light source is located so that the copying material is illuminated through the original to be copied from the interior of the cylinder. In this case, the holding device would partly obscure the light source. Moreover, a device using the proposal cannot be utilized to the optimum because individual functions, such as stopping in the conveyor position, do not depend on the actual length of the original but on predetermined cycle times. This results in idle times which reduce copying capacity.

There has also been proposed, in DT-OS 2,018,148, a copying device with a rotatable copying cylinder and three cooperating conveyor devices. The first conveyor device surrounds a part of the copying cylinder and transports the original, in contact with the copying material, along the copying cylinder. The second and the third conveyor devices are arranged in such a way that they transport the original to be copied successively from the point where it is fed into the device up to the point where it is brought together with the copying material. After the original has run through on the copying cylinder together with the copying material, the original may be gripped again by the second conveyor device. Since the original to be copied is led back over the second and the third conveyor devices, the circulation path of the original to be copied can be substantially lengthened as compared with the other devices in which the original is led back by the copying cylinder itself. If a smaller original, having a length less than the circulation path on the conveyor devices, is to be repeatedly copied, it is possible, in order to shorten the circulation time, to switch to a higher passage speed which becomes effective when the end of the original has left the copying cylinder and remains effective until the leading edge has again reached the copying cylinder for renewed exposure. Advantageously, the switching over of the speed can be regulated photoelectrically. However, this possibility of increasing the passage times for shorter originals is restricted, in particular because of the above-mentioned condition.

There remains a need for a process and apparatus for manifold copying or originals, which reduces idle time during the transport procedure, suitable for different sizes of original, and in which the original to be copied is transported at a uniform speed through an illumination zone in an uncomplicated manner and which is also applicable to those copying machines in which the original to be copied is not fastened to a drum or to a cylinder.

The present invention provides a process for the transport through a copier of an original having a leading and a trailing edge, which comprises transporting the original at least once along a path wherein it passes in the stated order a third point, and illumination zone, a fourth point, a first point, a second point and, if it is transported more than once, the first point again wherein if the trailing edge has not passed the third point when the leading edge passes the second point the path length between the first and second points is extended and wherein if the trailing edge has not passed the second point when the leading edge passes the first the path length between the illumination zone and the first point is extended and wherein the speed of the original past the first point may be increased relative to its speed in the illumination zone at least while an extended path is followed between the zone and the first point and after the trailing edge has passed the second point.

Advantageously, each extension of the path length takes place by forming a loop in the original, preferably by stopping the leading edge at or in the region of the second and first points, as required.

The process is applicable to various types of copying machines. In particular, it does not require that the leading edge be fastened to a cylinder of the copying machine, and the process can be used with blueprint machines having a cage cylinder illuminated from within. It is a particular advantage of the process that the transport of the original to be copies through the illumination zone is unaffected by the procedure involved in reiterative copying. In particular, only one drive unit is needed to transport the entire original through the copying (illumination zone. This eliminates changes in the speed of the original to be copied in the illumination zone, which changes could diminish the quality of the copies. According to the process, large sizes and sizes above a certain minimum size are copied without significant idle times. Thus, the copying capacity of a copying machine using this process is high, and no adjustment is required by the operator to the process depending on whether large or small originals are to be copied since the course of the process is automatically adapted to different sizes of originals.

Advantageously, the original passes together with copying material through the illumination zone, separation taking place between the illumination zone and the fourth point. Advantageously, also, the speed of travel of the original is kept constant up to the fourth point, path extension, for example by loop formation, taking place between the fourth and first points.

Disturbance of the movement of the original during its passage through the illumination zone is minimized if it is subsequently completely released from the transport unit moving it through the zone, and is only re-engaged with the transport unit after it has completed its passage through any path-extending stages. Feedback is well avoided if the original is transported continuously behind the position of separation that is, from the fourth point through to the first. In this case after the original to be copied is separated from the copying materials, two loops form at different, predetermined points of the path, without having a feed-back effect.

The present invention also provides a device for carrying out the process, which comprises three independently operable transport means, the first, preferably comprising a rotatable drum or endless belt, for passing through an illumination zone, the second, downstream from the first, capable of transporting the original at a speed different from the first, preferably capable of transporting the original at a higher speed than the first and of holding the original stationary, whereby the path length of the original between them may be altered, and third means, downstream from the second capable of transporting the original at a speed different from the second, preferably of holding the original stationary, whereby the path length between them may be altered.

The three transport means are of course capable of transporting the original through them at equal speeds, so that the path length is constant during any particular operation or part thereof.

The invention also provides copying apparatus, especially for making blueprints, including the device.

The advantages mentioned above, in relation to the process, are obtainable by using this device with uncomplicated mechanical and constructional means. Only one transport unit is directly connected to the cylinder, with which the original to be copied moves through the illumination zone. Inter alia, this makes a relatively uncomplicated mechanical design of the transport device possible, and feed-back effects of the additional transport units on the transport of the original to be copied through the illumination zone are reduced. Above all, however, using this transport device, originals to be copied which are of very different lengths can be guided back to the illumination zone virtually without restrictions and in the minimum time.

The apparatus preferably also comprises a control mechanism which includes detection devices associated with the second and third transport means, and a detection device upstream of the first transport means, outputs from the detection devices being connected to a control device the output of which is connected to drive elements of the second or third transport means. This control mechanism automatically takes into account the precise length of the respective original to be copied.

The device is useful in connection with, and as part of, a copying apparatus having a light source in the interior of the apparatus for illuminating the illumination zone and a continuous belt arrangement which, in the range of the illumination zone rests on the outside of the rotatable cylinder, it being possible for the original to be copied to be moved, together with the copying material, through the illumination zone while in contact with the cylinder, and having a separating device downstream from the illumination zone by means of which the original to be copied and the copying material can be lifted off the cylinder and the original separated from the copying material, and with guide means leading to a receiving device for the original to be copied. In such apparatus, the second and third transport means are located downstream from the separating means and upstream of the guide means. This embodiment is especially suitable in a blueprint machine. The characteristics of the transport device enable a customary blueprint machine to be redesigned for step-and-repeat operation without a fundamental alteration in the construction of the cylinder, on which the illumination zone is formed, and the transport unit belonging thereto.

Advantageously a fourth transport means is provided, before the second but after the first and, if it is present, after the separating means. This makes the formation of loops behind the illumination zone particularly reliable, while feed-back effects on the transport in the illumination zone are avoided.

The guide means in the transport path, which can lead the original to the receiving device advantageously has two positions, the original to be copied being returned to the feed device in one position of the guide part and being ejected from the closed path into the receiving device in the other position. In order to actuate the guide means, which is designed in the manner of switch-points, a pre-adjustable counter is provided, on which the desired number of copies may be set. The counter is connected to a scanning element for the input of impulses corresponding to the number of exposed copies. On the output side, the counter acts on an actuating element of the guide part.

The copying apparatus is of course designed so that sufficient space is allowed for the extension of the path of the original when necessary, for example, space for a loop to hang down or otherwise to be formed. The apparatus also may comprise pivotally mounted guide elements to guide the original in a direct or extended path.

The pivoting guide element has the effect that the original to be copied is reliably guided along the path, as long as no loop is formed, even in the region of the holding spaces in which a loop can form. If, however, a loop should form, the appropriate holding space is opened by pivoting the guide element away.

For trouble-free operation, the apparatus advantageously also comprises, in order to form a loop, a dancing roller which can be moved into the holding space receiving the loop. The dancing roller prevents a back-up of the original to be copied at an undesirable point. Should the loop not form downwards in the direction of gravity, the dancing roller will, under the reaction of a spring, nevertheless ensure that the loop is formed.

Advantageously, the second, third and fourth transport means each comprises a pair of rollers, each connected to a drive element. As a result, the additional transport units are reliable in operation but relatively inexpensive.

Advantageously, the second transport unit, which is rotatable at a speed different from, preferably higher than, that of the other transport units, rests against the original to be copied with less static friction than the remaining transport units. This makes it possible, in a particularly simple manner, to drive it at a higher speed so that it fulfills the desired function without, however, unduly stressing the original to be copied and, at worst, causing tearing of the original to be copied.

Alternatively, a slip clutch can be arranged between this transport unit and its drive element.

It is, however, also possible that, omitting a special mechanical design, the second transport unit, which is rotatable at a speed higher than that of the other transport units, is electrically controlled by means for detecting the presence of an extended path length upstream of the second transport means, having an output which influences the speed of travel of the original through the second transport means. In that case, it assumes an increased circumferential speed only if this circumferential speed leads to a transfer of the first loop into the holding space for the second loop.

One process carried out and one apparatus constructed in accordance with the invention will now be described in greater detail, by way of example only, with reference to the accompanying drawings, in which:

FIGS. 4 to 10 show very simplified representations in which individual phases of the transport of the original to be copied are represented.

Figure 1:
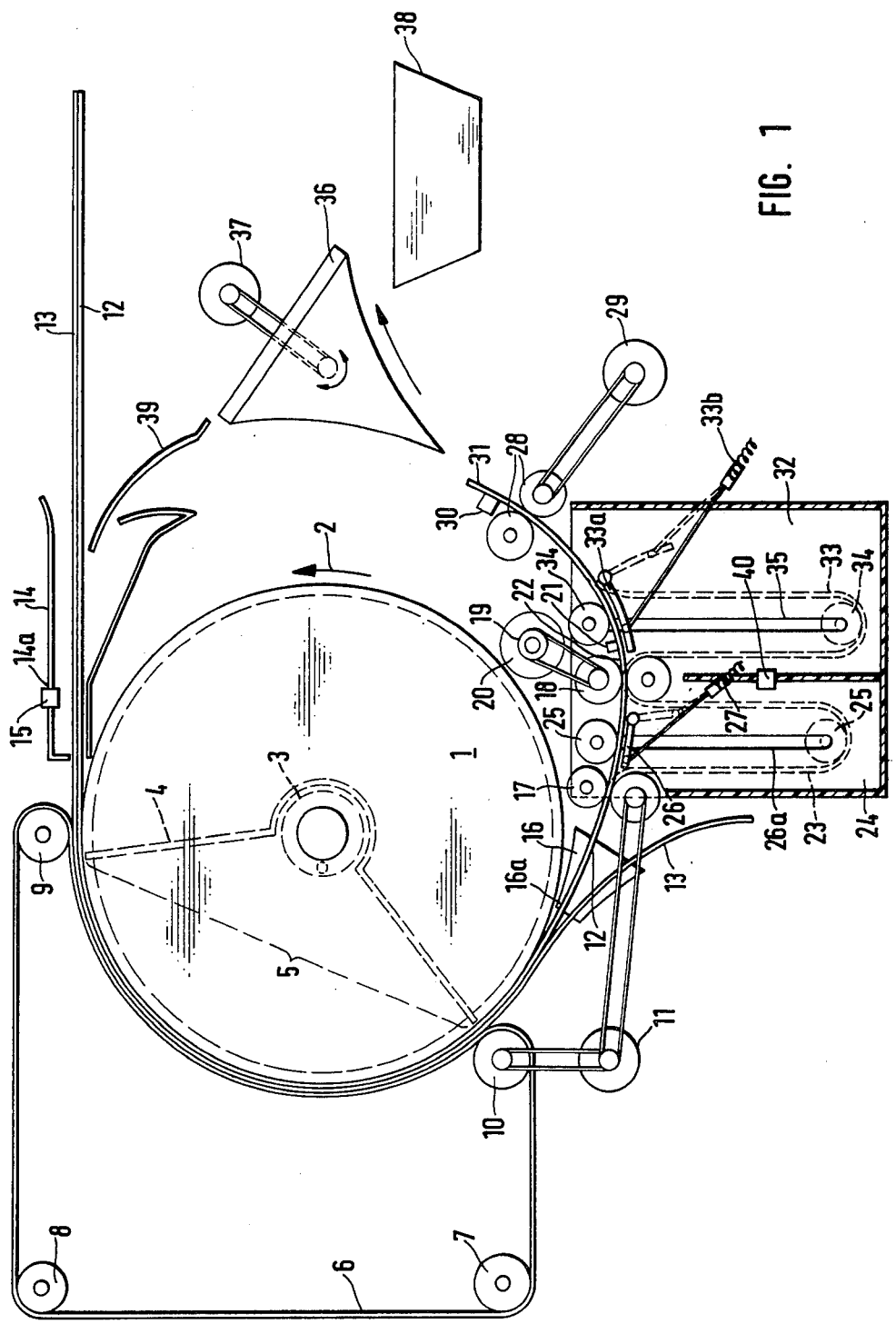
FIG. 1 illustrates the transport device of a blueprint machine in a schematic side view (partially in section)

Referring now to FIG. 1, a cylinder of a blueprinting machine is designated as 1; this cylinder is rotatable in the direction indicated by an arrow 2 and a light source 3 is arranged coaxially with the cylinder in its interior. A screen 4 screens the light source in such a way that only a zone 5 is illuminated from the inside. In the region of the illumination zone 5, part of a continuous belt 6 is pressed against the outer wall of the cylinder. The continuous belt runs over freely rotating rollers 7, 8, 9 and a roller 10 which is driven by a motor 11. The motor 11 could be coupled to the rotatable cylinder 1, while all the rollers 7, 8, 9 and 10 could run freely. The cylinder 1 and the continuous belt are to be regarded as parts of a first transport device which effects the transport of an original 12 to be copied and of a section of copying material 13 through the illumination zone.

The original to be copied, placed underneath the copying material, is fed into a take-up device 14 at a take-up point 14a. The device 14 takes up, horizontally as shown in the drawing, a copying material and, underneath the latter, either a newly introduced original to be copied or an original which has already been around the cylinder, under fresh copying material. At the pick-up point 14a there is a first scanning element 15 which may incorporate a photoelectric transducer.

The take-up device 14 is followed in the direction of transport of the original by the illumination zone 5 and the latter in turn is followed by a separating device 16 for lifting the original to be copied and copying material off the cylinder and for separating the exposed copying material from the original to be copied, at the separation point 16a. A receiving device (not shown) for the exposed copying material is provided after the separating device 16 and a transport unit 17 which is designated as the fourth transport unit is arranged in the path of the original at the "fourth point", behind the separating device. In the further course of the path of the original, a second transport unit 18, which is shown as a pair of rollers, follows at a distance from the fourth transport unit. One roller of the transport unit is coupled to a drive element 20 via a slip clutch 19. Immediately behind the second transport unit 18, the path of the original to be copied is scanned by a second scanning element 21.

For the purposes of the description which follows, the second transport unit 18 and the second scanning element 21 are located at virtually the same point, which is the "first point" 22 of the path.

Below the path of the original to be copied, between the fourth transport unit 17 and the second transport unit 18, there is a holding space for receiving a first loop 23 of the original. Between the fourth transport unit and the second transport unit, a dancing roller 25 rests on the original to be copied. The dancing roller is guided in a slot 26 in the holding space. Between the fourth transport unit 17 and the second transport unit 18, and below the path of the original to be copied, there is a pivotally mounted guide element 26 which can be pivoted, by an actuating member 27, into a first pivoting position (shown in FIG. 1 by a full line) and into a second, open pivoted position (shown by a broken line). An electrical scanning element 40, which can be used to detect the presence of a loop, is provided in the holding space 24.

In the further course of the path of the original, the second transport unit is followed by a third transport unit 28 which is composed of a pair of rollers and is driven by a drive element 29. A third scanning element 30 follows immediately behind the third transport unit, and their vitually common position is designated as the "second point" 31.

Between the second transport unit 18 and the third transport unit 28, and below the path, there is a second holding space 32 for receiving a second loop 33 of the original to be copied. The original to be copied is pressed downwards by a second dancing roller 34 which is movable in a slot 35. A rotatable guide part 36 which can be rotated at will into one of two positions by means of a drive element 37 follows in the course of the path of the original to be copied. The guide part 36 here has the function of switch-points so that the original can be thrown into a receiver device 38 or can be led back to the take-up device via a guide plate 39.

Figure 2:
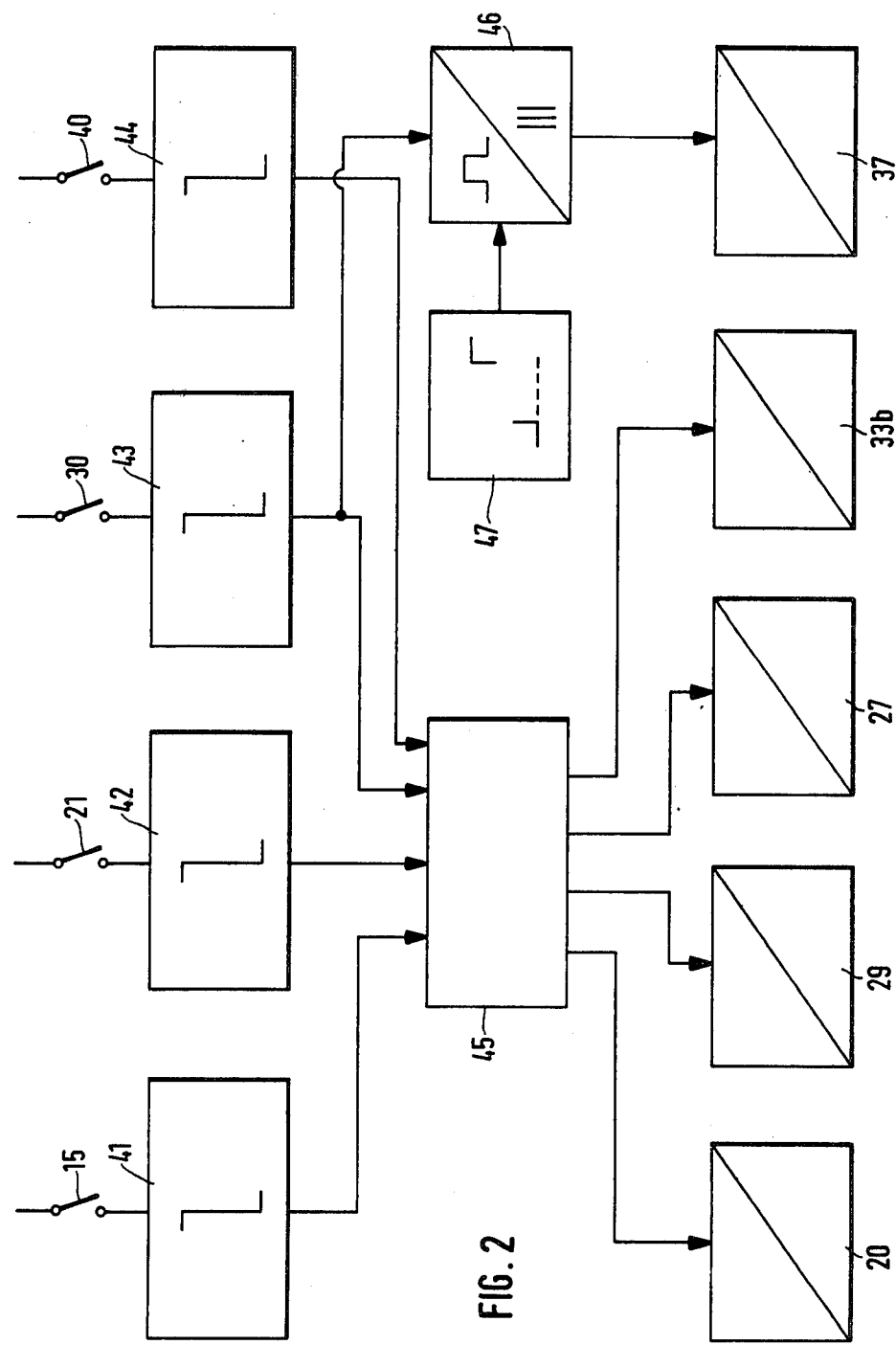
FIG. 2 shows a block diagram of the electrical circuit arrangement in which the essential electrical elements of the transport device are linked to one another.
Figure 3:
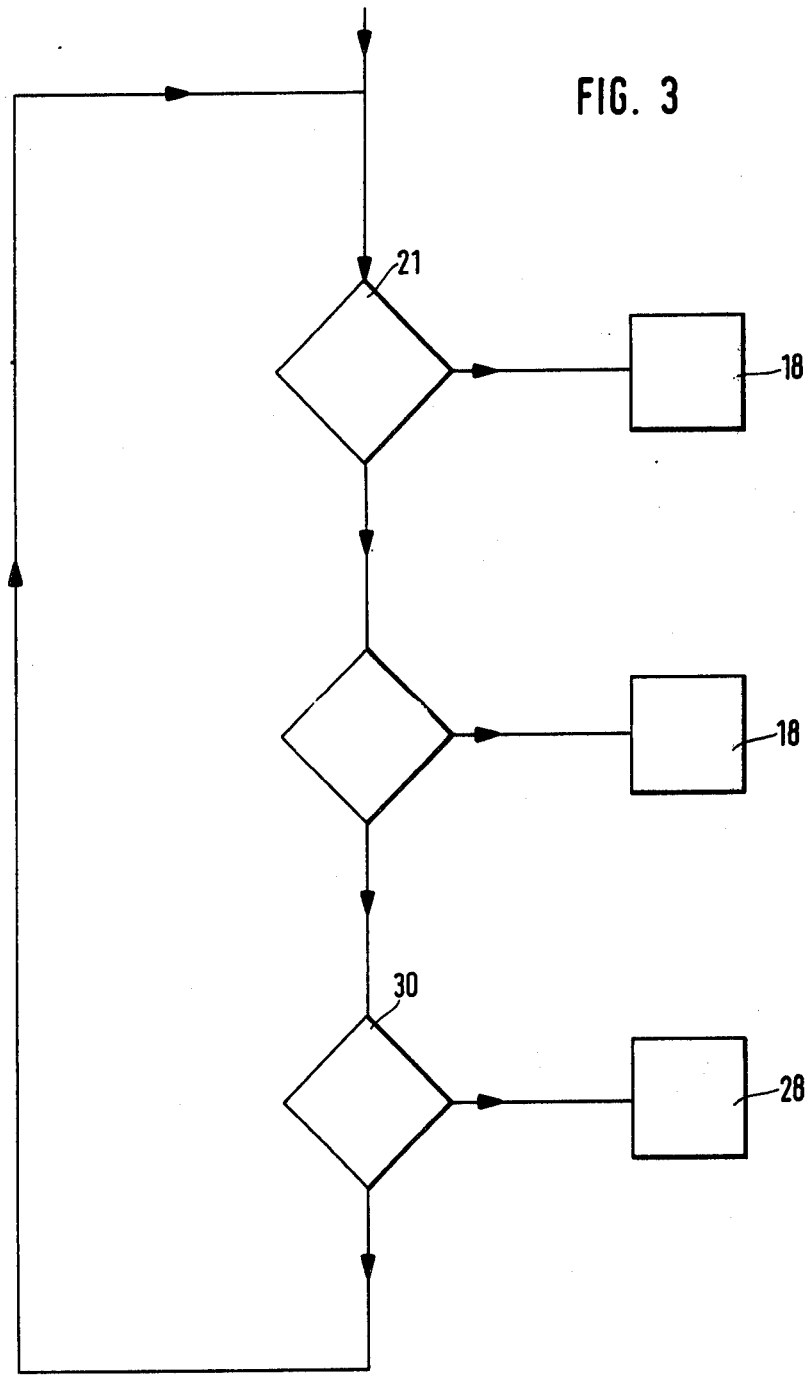
FIG. 3 shows a schematic representation to illustrate the process, carried out using the transport device, for step-and-repeat transport.

The electrical circuit arrangement, in which the electrical elements which have so far been mentioned, are linked to one another, is explained in more detail with reference to FIG. 2.

In this arrangement, each of the scanning elements 15, 21, 30 and 40 is connected to a pulse shaper 41, 42, 43 or 44 respectively, the pulses being led to the inputs of a common logic and storage circuit. The manner in which this circuit arrangement must be built up results from the mode of action of this logic and storage circuit, which is discussed further below. On the output side, the logic and storage circuit is connected to the second and the third transport unit 18 and 28 respectively and to the first and the second guide element 26 and 33a.

Furthermore, a line leads from the output of the pulse shaper 43 on the scanning element 30 to a counter 46 which can be preset by an adjuster 47, corresponding to the desired number of copies. A connection leads from the output of the counter 46 to the drive element 37 of the guide part 36.

The process of the invention will now be described in more detail (see FIGS. 3 to 10).

It is assumed that at the start of a copying operation all the transport units are in operation so that they are suitable for moving the original to be copied at a uniform speed and that the light source 3 is emitting.

Copying material 13 for example, in sheet form is pushed, above an original 12 to be copied, into the take-up device 14. The original to be copies and the copying material, in contact with one another, are transported into the illumination zone 5 in which the copying material is exposed through the original. Subsequently, the copying material 13 is separated from the original 12 in the separating device 16, the original also being lifted off the cylinder. The copying material is ejected at the separating point 16a; the original, however, is moved by the fourth transport unit 17, the second transport unit 18 and the third transport unit 28 up to the third scanning element 30. The positions of the original which correspond to this movement are represented by uninterrupted lines in FIGS. 4 and 5. That is to say that at this stage the original is not yet running, during this movement, through the loops represented by the interrupted line in FIGS. 1, 4 and 5. At this stage, the pivotally mounted guide elements 26 and 33a are moved up to the path of the original to be copied in the position drawn by a full line in FIG. 1.

When the leading edge of the original, after its first passage through the copying zone reaches the third scanning element 30, the logic and storage circuit 45 (FIG. 2) interrogates the scanner 15 at the take-up point 14a, as to whether a section of the original to be copied is still present there. As long as the first scanning element 15 detects the presence of an original to be copied at the take-up point, the transport unit 28 is stopped, while the remaining transport units continue to run. The second pivotally mounted guide element 33a is lowered by means of the actuating member 33b, and a loop 33 of the original forms in the space 32. At the same time, the loop 33 is lowered by the dancing roller 34. This state is represented in FIG. 5a.

When the first scanning element 15 signals that an original is no longer present at the take-up point, while the leading edge of the original is still retained at the second point of the path 31 in the region of the third scanning element 30 and of the third transport unit 28, which means that the trailing edge of the original must have passed the first scanning element 15, the drive element 29 is switched on again (FIG. 6).

Moreover, as a result of the signal triggered in the third scanning element 30 by the leading edge of the original, a pulse passes into the counter 46 which has been preset corresponding to the number of copies to be prepared. If the counter indicates that the preset number of copies has not yet been reached, the guide part 36 remains in the position drawn in FIG 1 and the original is led back to the take-up device 14. If, however, the counter 46 indicates that the last required copy has been prepared as the original passed through the illumination zone, the guide part 36 is turned by the drive element 37 into such a position that the original is ejected into the receiving device.

Figure 7:
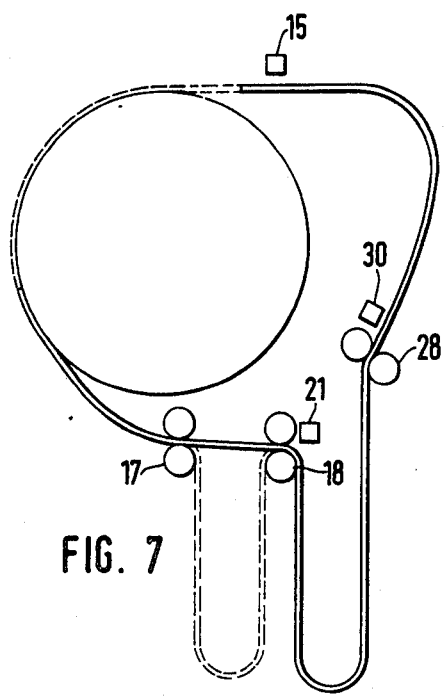
Figure 8:
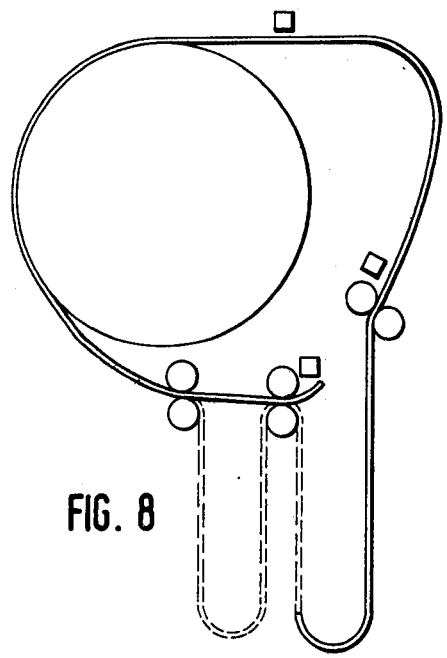

The first-mentioned case in which the original is led back to the take-up device for a second or repeated copying process, is represented in FIG. 7. In this case, the loop 33 which has formed in the space 32 is initially preserved, since according to the preconditions all the transport units move the original at the same speed.

Figure 9:
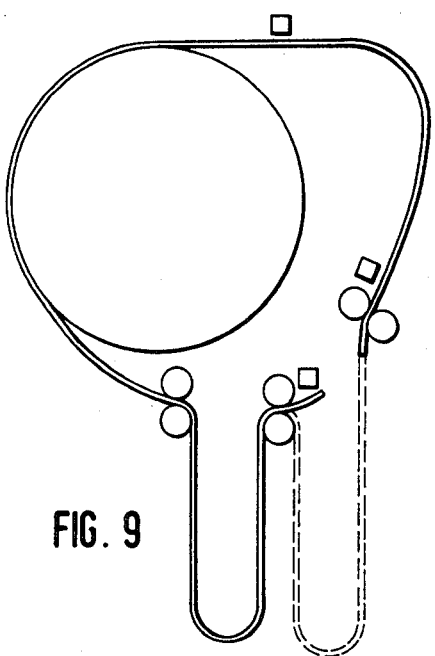

When the second scanning element 21 signals that the leading edge of the original has again reached the first point of its path 22, the logic and storage circuit 45 interrogates the third scanning element 30 as to whether a section of original is still present at the second point 31 of the path. This will be the case with a relatively long original and the drive element 20 is stopped and the second transport unit 18 does not transport the original any further. At the same time, the guide element 26 is lowered by the actuating member 27. Since the region of the leading edge of the original is firmly held at the first point 22 of its path but the remaining section of the original is transported further, a loop 23 forms in the first space 24 under the action of the dancing roller. (The loop 23 which, in the direction of transport, is in front of the loop 33, is called the first loop). While the first loop 23 is thus formed, the loop 33 gradually disappears (FIG. 9).

As soon as the third scanning element 30 at the second point 31 signals that it is no longer detecting an original, that is, the trailing edge has passed through, the second transport unit 18 restarts as the drive element 20 is switched on.

At this stage, the original is moved by the second transport unit at an increased speed, as long as a part of the first loop 23 is present in the space 24. This can occur as a result of the fact that the drive element 20, if it is switched on, always tries to move the second transport unit 18 at a speed higher than that of the remaining transport units, but this increased speed cannot become effective as long as the original is tautly held between the first additional transport unit and the auxiliary transport unit 17. In the embodiment shown in FIG. 1, this can be effected by means of a slip clutch 19 on the drive element 20. As a second possibility, the static friction of the pair of rollers which forms the second transport unit 18 may be reduced compared with the static friction of the auxiliary transport unit 17, for example by the choice of material or the contact pressure. A third possibility, which also can be combined with the first and the second possibility, is to arrange in the space 24 a scanning element 40 for scanning the formation of a loop, the scanning element switching the drive element 20 from normal speed to increased speed, as long as a loop is present in the space 24.

Figure 10:
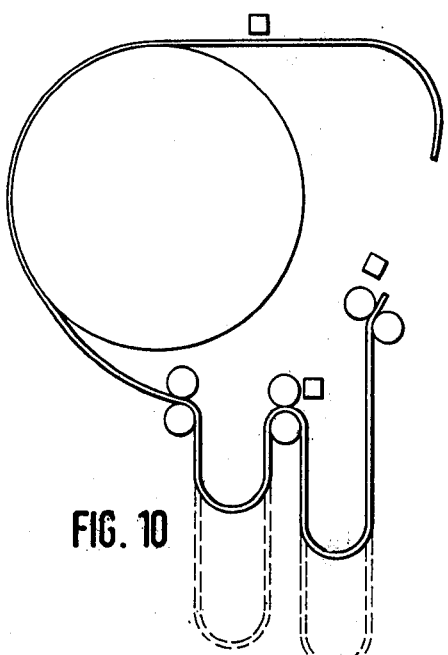

The rapid transport of the original to be copied between the auxiliary transport unit 17 and the space 32 continues until the first loop 23 has been completely transferred into the second loop 33 (FIG. 10).

Thereafter the space 24 is available again for a renewed formation of a loop during the next cycle of the leading edge of the original to be copied.

The process above describes the operation required if it is intended to make numerous copies of a relatively long original. Relatively long here means that the original to be copied is longer than the closed path of the original along the illumination zone and the guide elements in the region in which the original to be copied is lifted off of the cylinder 1.

The process for the repeated transport of an original that is shorter than its path around the cylinder, is as follows:

The original to be copied which is introduced together with the copying material into the take-up device 14 runs along the illumination zone 5, through the separating device 16, through the pair of rollers of the fourth transport unit 17, along the lifted guide element 26 and through the pair of rollers of the second transport unit 18 to the second scanning element 21.

The effect of the scanning element 21 is, via the logic and storage circuit 45, that the third scanning element 30 interrogates as to whether a section of the original to be copied is still present at the second point of the path 31. This will not be the case. The leading edge of the original runs to the lifted guide element 33a between the twin rollers of the third transport unit 28 up to the third scanning element 30. By means of the logic and storage circuit 45, the scanning element 30 causes the first scanning element 15 to interrogate again at the pick-up point 14a as to whether a section of the original to be copied is still present there. Since this will not be the case, the original is not stopped in the region of the third transport unit 28 and, if the set number of copies has not yet been reached, it runs via the guide part 36 into the take-up device 14 for renewed copying.

The idle time between the end of a copying procedure, when the trailing edge has run through the illumination zone, and the start of the next copying procedure, when the leading edge runs into the illumination zone, thus depends largely on the distance of the third scanning element 30 from the first scanning element 15 along the path of the route of the original, if the original to be copied is long compared to the path around the cylinder 1. In the other case, if the original to be copied is relatively short, the idle time corresponds to the extent to which the total closed path exceeds the length of the original to be copied. Accordingly, the closed path is designed, according to the intended use, to have dimensions which are not substantially longer than the shortest original likely to be copied.

It will be obvious to those skilled in the art that may modifications may be made within the scope of the present invention without departing from the spirit thereof, and the invention includes all such modifications.

What is claimed is:

1. A process for the transport through a copier of an original having a leading and a trailing edge, which comprises transporting the original at least once along a path wherein it passes in the stated order a third point, an illumination zone, a fourth point, a first point, a second point and, if transported more than once, the third point, the illumination zone, the fourth point, the first point and the second point again, wherein if the trailing edge has not passed the third point when the leading edge passes the second point the path length between the first and second points is extended and wherein if the trailing edge has not passed the second point when the leading edge passes the first point the path length between the illumination zone and the first point is extended and wherein the speed of the original past the first point is increased relative to its speed in the illumination zone while an extended path is followed between the zone and the first point and after the trailing edge has passed the second point.

2. A process as claimed in claim 1 wherein extension of the path is effected by forming a loop.

3. A process as claimed in claim 1 wherein the path extension is effected by stopping the leading edge.

4. A process as claimed in claim 1 wherein the speed of travel of the original along the path is constant up to the fourth point, and the path extension between the zone and the first point takes place between the fourth and first points.

5. A process as claimed in claim 1 wherein the original and copying material pass together through the illumination zone and are separated between the zone and the fourth point.

6. Apparatus for repeatedly transporting an original through a copying machine along a closed path, which comprises three transport means operable independently of each other, the transport means being first transport means for passing the original through an illumination zone, second transport means, downstream from the first, capable of continuously transporting the original either at the same speed as the first or at a higher speed than the first or to hold the original, and third transport means, downstream from the second, capable of transporting the original either at the same speed as the first or of holding the original, said apparatus also comprising a first detection device downstream from said second transport means, a second detection device downstream from the third transport means and a third detection device upstream of the first transport means, outputs from the detection devices being connected to a control device the output of which is connected to drive elements of the second and third transport means, and first means for altering the path length between the first and the second transport means, and second means for altering the path length between the second and the third transport means.

7. Apparatus as claimed in claim 6 wherein the first means comprises a rotatable cylinder.

8. Apparatus as claimed in claim 6 which is suitable for use in a process in which copying material passes through the illumination zone with the original, which also comprises separating means for separating the copied original from the copying material and guide means for guiding the separated copied original to a receptacle, wherein second and and third transport means are located downstream from the separating means and upstream of the guide means.

9. Apparatus as claimed in claim 6 including a fourth transport means between the first and second means.

10. Apparatus as claimed in claim 8 including a fourth transport means between the separating means and the first means.

11. Apparatus as claimed in claim 8 wherein the guide means is adjustable to guide the original either to a receptacle or to return it to the illumination zone for further copying.

12. Apparatus as claimed in claim 6 which also comprises means for forming a loop to extend each extensible path.

13. Apparatus as claimed in claim 12 wherein the loop-forming means comprises a dancing roller.

14. Apparatus as claimed in claim 6 which comprises a pivotally mounted guide element means to guide the original either in a direct path, or in its extended path, between the transport means.

15. Apparatus as claimed in claim 6 wherein the second, third and fourth transport means comprise a pair of rollers, each of which is connected to a drive element.

16. Apparatus as claimed in claim 6 wherein the second transport means, in operation, rests against the original to be copied with less static friction than the remaining transport means.

17. Apparatus as claimed in claim 15 including slip clutch means arranged between the second transport means and its drive element.

18. Apparatus as claimed in claim 6 which also comprises detection means for detecting the presence of an extended path length upstream of the second transport means, having an output which influences the speed of travel of the original through the second transport means.

19. A copying device incorporating apparatus as claimed in claim 6.

* * * * *